3,091,651
Patented May 28, 1963

3,091,651
PREPARATION OF 9-METHYLENE FLUORENE
Frederick J. Soderquist, Essexville, and Jerome H. Stickelmeyer and James L. Amos, Midland, Mich., assignors to The Dow Chemical Company, Midland, Mich., a corporation of Delaware
No Drawing. Filed Nov. 3, 1960, Ser. No. 66,895
4 Claims. (Cl. 260—668)

This invention relates to a method of producing 9-methylene fluorene. More particularly, it relates to the preparation of this material from 9-methyl fluorene by a process of dehydrogenation.

It has been known heretofore to prepare 9-methylene fluorene from substituted 9-methyl fluorenes. Thus, for example, the dehydration of 9-methyl fluorenol gives rise to this desired product. However, attempts to produce 9-methylene fluorene directly from 9-methyl fluorene have been unsuccessful. For example, phenanthrene, rather than 9-methylene fluorene, is obtained when a mol of hydrogen is eliminated from a mol of 9-methyl fluorene by passing the latter through a tube heated to dull redness.

Accordingly, the present invention has as its object the provision of a method whereby 9-methylene fluorene can be prepared directly from 9-methyl fluorene without the necessity of first preparing substituted derivatives of this latter material.

This object of the present invention is achieved by the dehydrogenation of 9-methyl fluorene through the agency of dehydrogenation catalyst, particularly a catalyst of the so-called self-reactivating type. These latter catalysts have been well described in various patents and technical articles, particularly under the authorship of K. K. Kearby. These catalysts generally comprise major quantities of ferric oxide, zinc oxide or magnesium oxide, with minor quantities of chromium and/or copper salts. Additionally, they always include a basic compound such as potassium oxide or potassium carbonate.

While catalysts of the self-reactivating type are generally to be preferred as a practical matter because of their ability to function for prolonged periods without the necessity of regeneration, any of the catalysts generally useful in the dehydrogenation of hydrocarbons may be employed in the preparation of 9-methylene fluorene. These well-known dehydrogenation catalysts include alumina, silica-alumina mixtures, ferric oxide, chromium oxide, mixtures of ferric and chromium oxides, mixtures of either ferric oxide or chromium oxide or both with potassium oxide, and the like. Other dehydrogenation catalysts will, of course, suggest themselves to those skilled in the art.

In the practice of the invention the 9-methyl fluorene is passed as a vapor over a bed of the dehydrogenation catalysts maintained at the normal operating temperature of such catalysts, that is, at a temperature within the range of from about 500° C. to about 850° C. In the case of catalysts of the self-reactivating type, the preferred temperature generally lies within a somewhat narrower range of from about 550° C. to about 750° C.

The vapor of 9-methyl fluorene may be passed over the heated dehydrogenation catalyst as a relatively pure vapor or it may be admixed with various amounts of inert gaseous diluents such as certain hydrocarbon vapors, nitrogen, carbon dioxide or water vapor or mixtures thereof. Water vapor is, of course, the required diluent when a self-reactivation catalyst is employed.

Advantageously, the 9-methyl fluorene is employed as a solution in an inert solvent such as toluene. Inasmuch as 9-methyl fluorene is a solid at room temperature, its use as a solution makes for convenience in control of the rate of delivery of the material to the catalytic reaction zone. Additionally, it provides inert hydrocarbon vapor as a diluent for the reactive vaporized 9-methyl fluorene. The relative amounts of diluent vapor and reactive vapor may be controlled by varying the concentration of the solution.

The dehydrogenation reaction may conveniently be carried out in a tubular, vertical, electrically heated reactor containing the catalyst pellets and fitted with suitable feed, vaporizing and recovery appurtenances. The vaporizing appurtenance should be maintained at a temperature sufficiently high that, as the solution of 9-methyl fluorene in inert solvent is fed thereto, the total of the solution will vaporize to maintain the desired relative concentrations of reactive vapor and diluent vapor.

The rate of delivery of the feed mixture to the reactor is a matter of choice, being dependent on a variety of factors such as the nature of the particular catalyst, reactor dimensions, composition of the feed, temperature of the reaction zone and the like.

Recovery of product is effected simply by condensing the vaporized product of the dehydrogenation reaction. It will be found that if this is accomplished at a relatively high temperature, as at the temperature of ordinary cooling water, the 9-methylene fluorene will be obtained largely in its polymeric form, together with unreacted 9-methyl fluorene, condensed inert hydrocarbon diluent, water and traces of by-product materials. Polymeric 9-methylene fluorene is substantially insoluble in the other products of the reaction and can be readily isolated therefrom. As is known to the art, the polymer is readily thermally degraded to the monomeric product.

If recovery be effected at a relatively low temperature, as at the temperature of Dry Ice, the product will be obtained in the monomeric form in admixture with the other constituents of the vapor exiting from the reactor.

The invention is further illustrated by the following examples, which are intended to be illustrative only, and wherein all parts and percentages, unless otherwise indicated, are on a weight basis.

*Example 1*

In an iron tube measuring approximately 2.1 cm. in internal diameter and provided with controllable electrical heating means, there were placed 70 cc. of a self-reactivating catalyst in the form of small pellets. The catalyst comprised iron oxide, chromium oxide and potassium oxide as its essential ingredients. Twenty-three parts of 9-methyl fluorene were dissolved in 46 parts of toluene. This solution was vaporized and passed, in admixture with steam, over the catalyst which was maintained at a temperature of 625° C. The hydrocarbon mixture was fed at the rate of 46 parts per hour while the steam was introduced at the rate of 63 grams per hour. Sixty-one parts of crude, water-insoluble product were obtained, on condensation of the exiting vapors in a water-cooled receiver. Of this total crude product 53 parts were liquid and 8 parts were solid, insoluble in the liquid portion. The liquid portion, when subjected to infra-red and mass spectrometric analyses, was found to consist of toluene, unreacted 9-methyl fluorene and trace amounts of fluorene and phenanthrene.

The solid material was separated from the liquid portion. A sample of this solid material was placed in the bottom of a short length of glass tubing closed at one end. The open end of this tube was joined to the open end of a similar tube, which was packed in Dry Ice, by a short length of rubber tubing. Heat was applied to the tube containing the sample to cause the depolymerization of the sample. Condensate collected in the cold tube. This was immediately dissolved in a cold mixture of carbon tetrachloride and carbon disulfide. The identity of the material was established as 9-methylene fluorene by infra-red analysis.

*Example 2*

The experiment described in Example 1 was repeated with the exception that the receiver was cooled in Dry Ice. The non-aqueous phase initially contained no solid material. The liquid product was then allowed to stand at room temperature for a period of 2 hours, during which time approximately 8 parts of solid material precipitated therefrom. Thermal degradation of this material, as described in Example 1, gave liquid 9-methylene fluorene.

What is claimed is:

1. A method for the preparation of 9-methylene fluorene which comprises the steps of passing vapors of 9-methyl fluorene through a zone wherein contact is effected between said vapors and a dehydrogenation catalyst maintained at a temperature of from about 500° C. to about 850° C., recovering the products of the reaction, isolating therefrom the polymeric form of 9-methylene fluorene and thermally converting the said polymeric form of 9-methylene fluorene to 9-methylene fluorene.

2. A method for the preparation of 9-methylene fluorene which comprises the steps of passing vapors of 9-methyl fluorene in admixture with an inert gaseous diluent therefor through a zone wherein contact is effected between said vapors and a dehydrogenation catalyst maintained at a temperature of from about 500° C. to about 850° C., recovering the products of the reaction, isolating therefrom the polymeric form of 9-methylene fluorene and thermally converting the said polymeric form of 9-methylene fluorene to 9-methylene fluorene.

3. A method for the preparation of 9-methylene fluorene which comprises the steps of passing vapors of 9-methyl fluorene in admixture with an inert gaseous diluent therefor comprising at least water through a zone wherein contact is effected between said vapors and a self-reactivating dehydrogenation catalyst maintained, at a temperature of from about 550° C. to about 750° C., recovering the products of the reaction, isolating therefrom the polymeric form of 9-methylene fluorene and thermally converting the said polymeric form of 9-methylene fluorene to 9-methylene fluorene.

4. A method for the preparation of 9-methylene fluorene which comprises the steps of passing vapors of 9-methyl fluorene through a zone wherein contact is effected between said vapors and a dehydrogenation catalyst maintained at the operative temperature thereof, and condensing the vapors exiting from said zone to obtain a reaction mixture comprising a material selected from the group consisting of 9-methylene fluorene and polymers thereof.

References Cited in the file of this patent

UNITED STATES PATENTS 2,414,118    Orchin    Jan. 14, 1947
2,658,089    Ipatieff et al.    Nov. 3, 1953

OTHER REFERENCES

Orchin: Chemical Abstracts, vol. 40, col. 3425 (1946).

Plattner: Newer Methods of Preparative Organic Chemistry, pp. 47–49, Interscience Publishers, Inc., New York, 1948.

Hansch: Chemical Reviews, vol. 53, No. 3, p. 362, Dec. 1953.